US007926156B2

(12) United States Patent
Jenks

(10) Patent No.: US 7,926,156 B2
(45) Date of Patent: Apr. 19, 2011

(54) VALVE KEEPER INSTALLATION TOOL

(76) Inventor: Harold Jenks, Oklahoma City, OK (US)

( * ) Notice: Subject to any disclaimer, the term of this patent is extended or adjusted under 35 U.S.C. 154(b) by 276 days.

(21) Appl. No.: 12/381,137

(22) Filed: Mar. 9, 2009

(65) Prior Publication Data

US 2010/0223770 A1 Sep. 9, 2010

(51) Int. Cl.
*B23P 19/04* (2006.01)
*B25B 7/02* (2006.01)

(52) U.S. Cl. ................ 29/214; 29/221; 29/248; 29/268; 29/278; 269/3; 269/6; 81/304

(58) Field of Classification Search .................... 29/214, 29/232, 242–243, 244, 255, 261, 268, 270, 29/278, 276; 269/3, 6; 81/304
See application file for complete search history.

(56) References Cited

U.S. PATENT DOCUMENTS

| | | | | |
|---|---|---|---|---|
| 2,431,636 A | | 11/1947 | Dougherty | |
| 2,517,583 A | | 8/1950 | Lunda | |
| 2,546,010 A | * | 3/1951 | McSherry | 29/213.1 |
| 2,586,756 A | | 2/1952 | Wolfe et al. | |
| 3,316,623 A | | 5/1967 | Clark | |
| 3,404,340 A | * | 10/1968 | Labrie | 324/72.5 |
| 4,079,765 A | * | 3/1978 | Hatayan | 81/44 |
| 4,593,443 A | * | 6/1986 | Wolford | 29/243.5 |
| 6,412,158 B1 | * | 7/2002 | Moore | 29/249 |
| 6,574,847 B1 | | 6/2003 | Scroggins | |
| 7,399,101 B2 | * | 7/2008 | Clausen et al. | 362/119 |
| 2010/0223770 A1 | * | 9/2010 | Jenks | 29/214 |

* cited by examiner

*Primary Examiner* — Lee D Wilson
(74) *Attorney, Agent, or Firm* — Edward L. White

(57) ABSTRACT

Valve keeper pliers that facilitate the installation of the two-part valve keepers in an internal combustion engine, the pliers comprising jaws and handles with a pivot point therebetween, at least two grasping pins per keeper projecting outwardly from a shoulder stop at a terminal end of each jaw, the pins adapted to abut an outer surface of a keeper, and at least one magnet substantially flush with each shoulder stop for engaging an end of a keeper, the magnet adapted to releasably retain a keeper in contact with its grasping pins while minimizing the magnetic attraction between the pins and the engine, whereby each keeper is retained in contact with its magnets and pins without requiring grip pressure to retain it in place allowing easier insertion of the keeper, particularly in cases where the keeper has more than one retention groove. The jaws are preferably offset from a plane created by the handles to facilitate reaching into the locations where the valve keepers must be installed. A spring means for biasing the jaws in an open direction is preferably provided. The pliers may be made from a substantially non-magnetic material whereby the tendency of the pins to be magnetically drawn toward the engine is minimized.

13 Claims, 4 Drawing Sheets

FIG 6
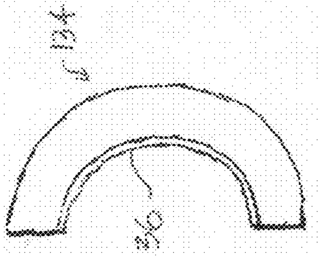
FIG 7
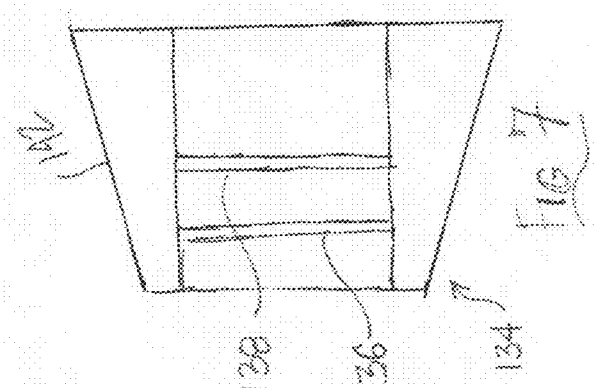
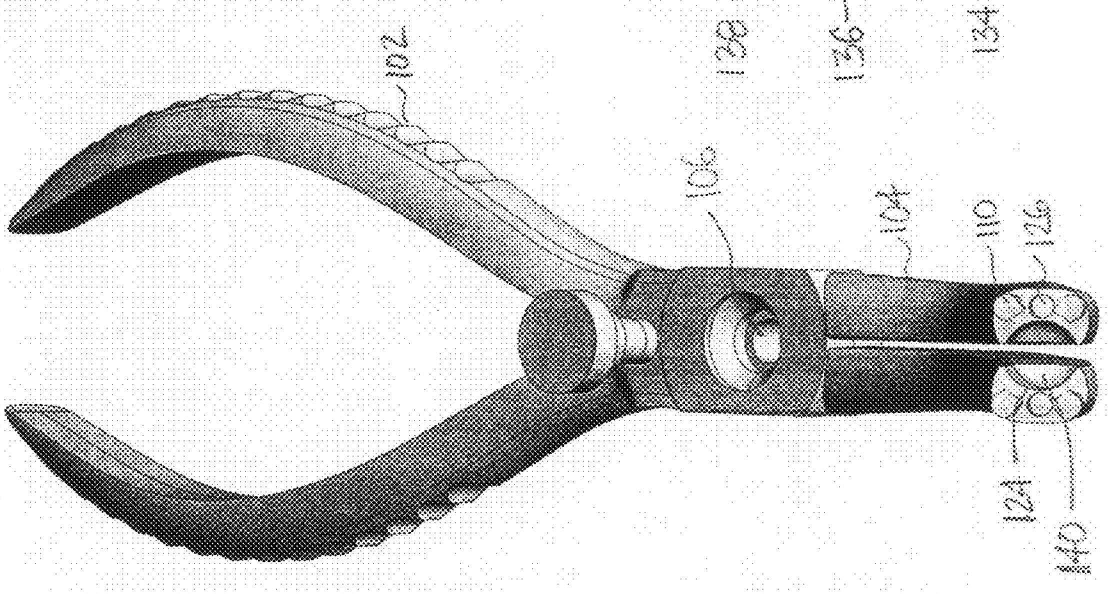
FIG 3

VALVE KEEPER INSTALLATION TOOL

RELATED APPLICATIONS

None.

BACKGROUND

A. Field of the Invention

The invention relates to tools associated with engine repair, specifically to tools associated with installation of valve keepers.

B. Related Art

The springs on the intake and exhaust valves of conventional internal combustion engines act against spring washers which are detachably locked to the stems of the valves by means of split, conical valve keepers which interfit the spring washers and engage at least one circumferential groove in the stem of the valve to retain the spring washer in place against the expansive pressure of the spring. In certain types of engines the valve stems and the stem surrounding springs are positioned in indentations or sockets in the block or cylinder head of the engine so that it may be difficult to reach the stems and springs and properly position the retainers in operating position when installing the valve assemblies in the engine.

When installing the keepers, it is necessary to hold the valve in place, to compress the spring, and to simultaneously place two small keepers in the proper position against the valve stem. This task is difficult under the best of circumstances, but it is even more difficult when there is more than one circumferential groove in the valve stem. In such a case, the keepers must be held out some distance from the stem while the keeper is pushed down until each groove engages the correct corresponding ridge on each keeper.

A particular problem is encountered using existing tools to try to place valve keepers with multiple circumferential grooves. When existing tools are used, the keepers slide downward onto the stem, and the first circumferential groove encounters the first ridge on the keeper, and prevents it from continuing downwardly so that the proper groove can contact the proper ridge. Mechanics have dealt with this difficulty by resorting to crude makeshift solutions. For example, a mechanic may stick each half of the keeper to a regular screwdriver using grease, then carefully try to ease both halves down into the proper position where each groove is set to encounter the proper ridge before contacting the keepers with the stem. These makeshift solutions to the problem have been difficult and time-consuming resulting in frustration for the mechanic and additional costs for the person whose engine is being repaired.

An additional problem with prior tools for installation of valve keepers is that many were designed to operate with a specific size of valve keeper. There was no way to accommodate a variety of sizes of keepers. Thus, a variety of tool sizes had to be kept on hand, and the proper one had to be selected for the particular size/type of keeper being installed. See, for example, U.S. Pat. No. 3,316,623 to Clark showing a tool that would only accommodate a narrow range of keepers as well as a narrow range of valve stem sizes.

There was thus a need for a valve keeper installation tool that could accommodate a range of valve stem sizes and, at the same time, be used with a range of valve keeper sizes.

SUMMARY OF THE INVENTION

The invention is a hand-held, valve keeper tool that facilitates the installation of the two-part valve keepers in an internal combustion engine. The pliers for installing a pair of valve keepers into an engine comprise jaws and handles with a pivot point therebetween, at least two grasping pins per keeper project outwardly from a shoulder stop at a terminal end of each jaw, the pins adapted to abut an outer surface of a valve keeper, and at least one magnet substantially flush with each shoulder stop for engaging an end of a keeper, the magnet adapted to releasably retain a keeper in contact with its grasping pins while minimizing the magnetic attraction between the pins and the engine. Thus, each keeper is retained in contact with its magnets and pins without requiring grip pressure to retain it in place allowing easier insertion of the keeper, particularly in cases where the keeper has more than one circumferential groove.

It is a further object to provide pliers with the jaws offset of a plane created by the handles to facilitate reaching into the locations where the valve keepers must be installed. Another object is to include a spring means for biasing the jaws in an open direction. A further objective is to manufacture the pliers from a substantially non-magnetic material whereby the tendency of the pins to be magnetically drawn toward the engine is eliminated.

There have thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in this application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. Additional benefits and advantages of the present invention will become apparent in those skilled in the art to which the present invention relates from the subsequent description of the preferred embodiment and the appended claims, taken in conjunction with the accompanying drawings. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application. The abstract is neither intended to define the invention of the application which is measured by the claims, nor is it intended to be limiting as to the scope of the invention in any way.

BRIEF DESCRIPTION OF THE DRAWINGS

FIG. 3 is a bottom perspective view, showing the grasping pins, magnet and other elements of this invention in greater detail.

FIG. 6 is a top view of a valve keeper.

FIG. 7 is a side view of a valve keeper.

DETAILED DESCRIPTION

Figure 1:
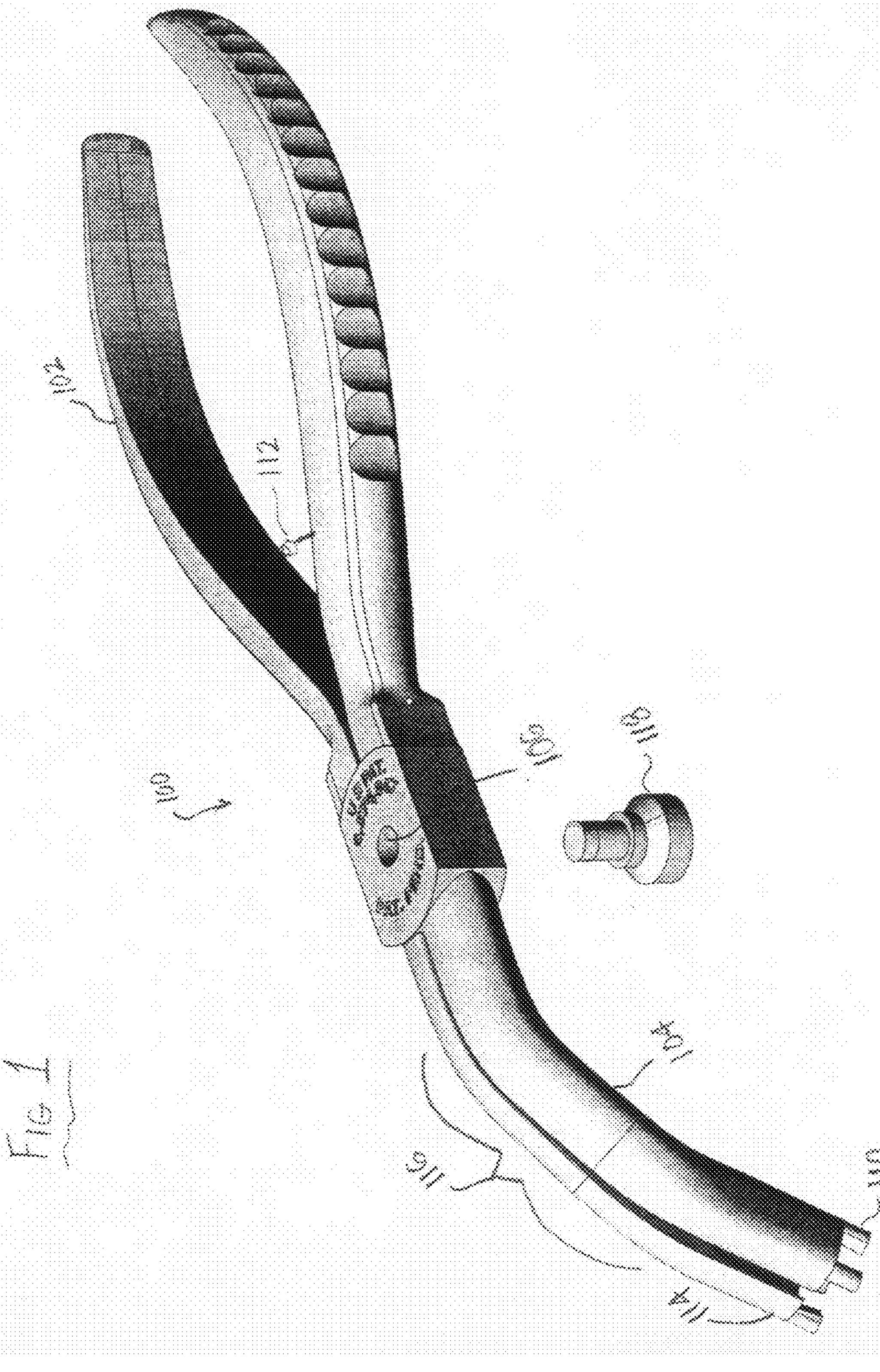
FIG. 1 is a perspective view of pliers according to the present invention.
Figure 2:
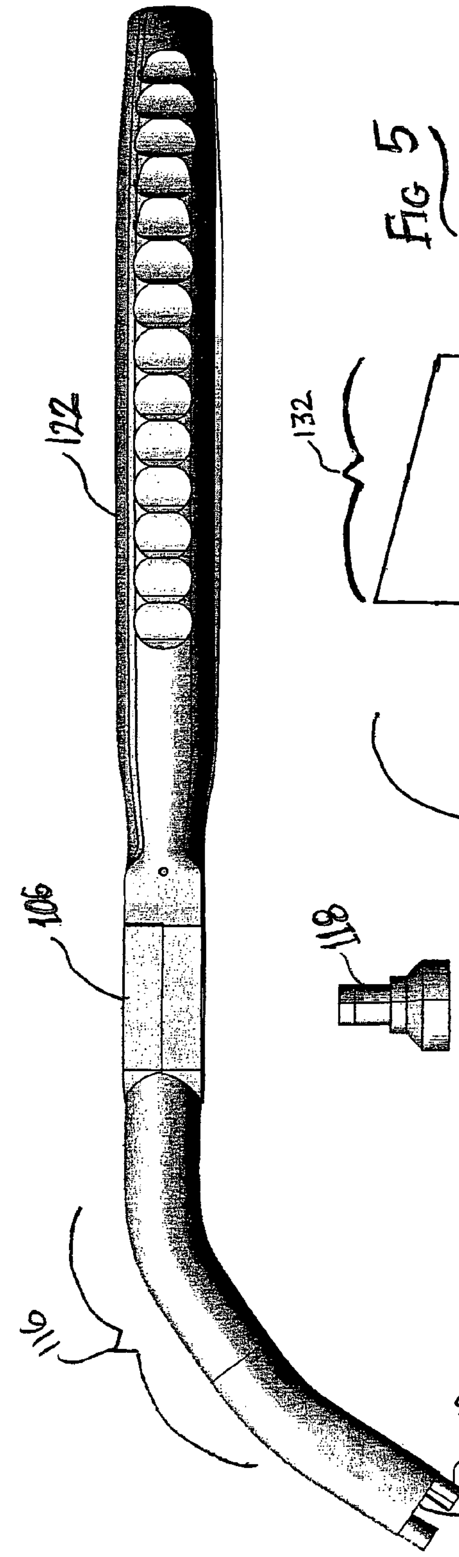
FIG. 2 is a side view of the pliers according to the present invention.

FIG. 1 shows a tool/pliers 100 according to the present invention. The pliers 100 have the standard components of handles 102, jaws 104, and a pivot point therebetween 106. The jaws 104 preferably have a bent portion 116 offset from a plane created by the handles 102. The bent portion 116 can be seen more easily in the side view shown in FIG. 2. At jaw ends 114 there are mounted at least two grasping pins 110 on each jaw 104. The grasping pins 110 contact the sides of a valve keeper 134 and, since they are not inherently shaped to mate with the back of a particular size of keeper, they can accommodate a wide range of keeper sizes. The pair of grasping pins 110 on each can be seen in FIG. 3 protruding from the shoulder stop 124 to which they are attached and within which the magnet 126 is inserted.

A biasing means 112 for urging the jaws 104 in an open direction is shown in FIG. 1. The purpose of the biasing means 112 is to allow the user to more easily operate the pliers 100 instead of having to place the users fingers inside the handles 102 to manually push the jaws 104 into an open position. As shown in FIG. 1, the biasing means 112 is a coiled spring. However, it could be spring steel or the like. The biasing means could be either mounted to push the handles 102 or the jaws 104 apart. If it is mounted so as to push the handles 102 apart, it would be mounted on the handle-side of the pivot point 106. If it is designed to push the jaws 104 apart, it will be mounted on the jaw-side of the pivot point 106. It may be desirable to have the biasing means 112 located closer to the pivot point 106 than is shown in FIG. 1.

Figure 4:
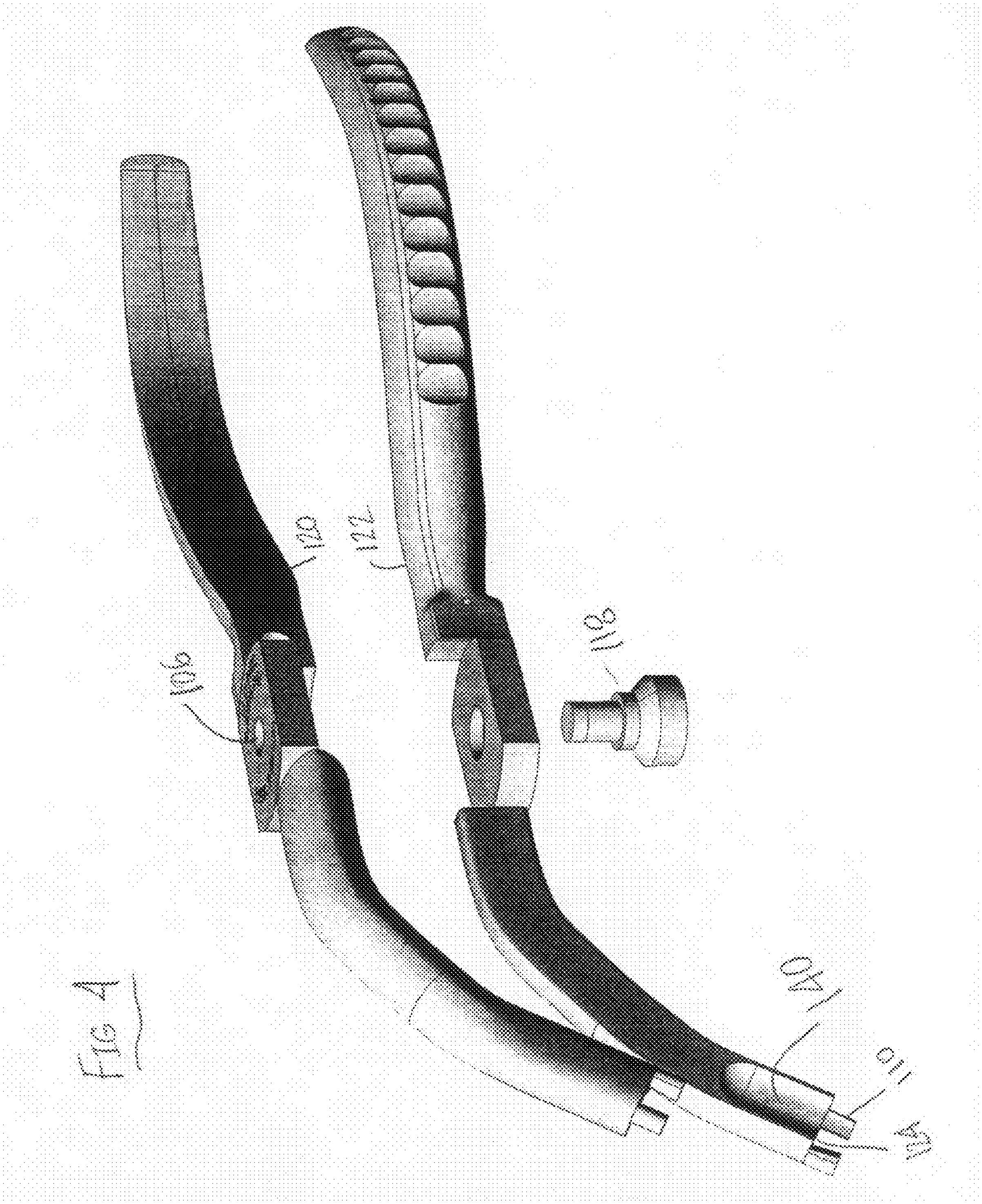
FIG. 4 is an exploded perspective view of pliers according to the present invention.

As shown, FIG. 4 illustrates that there is a pivot pin 118 holding together the first half 120 of the pliers 100 and the second half 122 of the pliers 100. It may be desirable to have the pivot point 106 be adjustable so that the jaws 104 can be biased further apart for larger valve keepers. Mechanisms to allow adjustable pivot points for slip-joint pliers are well known, and are incorporated herein by reference.

Figure 5:
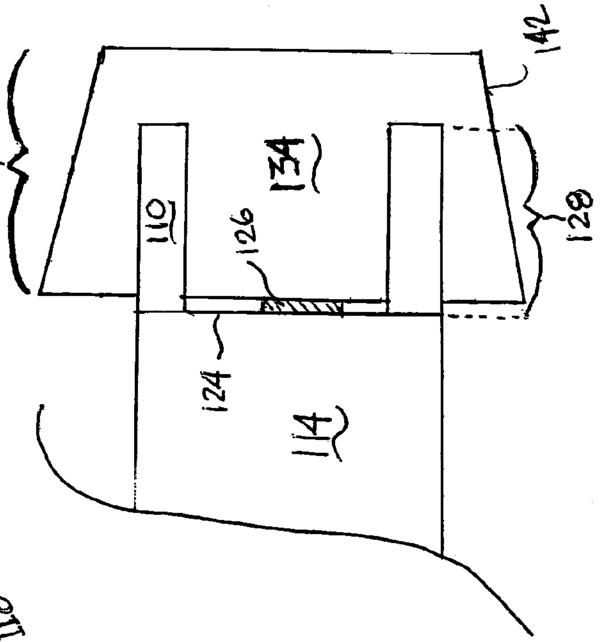
FIG. 5 is a detail side view of the jaw ends, grasping pins, and a valve keeper being held thereby.

FIG. 5 shows a valve keeper 134 being held in place by the variable holding means taught by the present invention. The valve keeper 134 contacts a magnet 126, which is mounted within a shoulder stop 124 and preferably, as shown, protrudes slightly beyond a surface of the stop 124. The valve keeper 134 is held in place by the magnet 126, so extending the magnet slightly above the surrounding stop 124 facilitates better contact therebetween. The grasping pins 110 contact the valve keeper 134 on its outer edge. The pins 110 preferably have a length 128 which is less than the overall length of the valve keeper 132. The pins 110 being shorter than the valve keeper facilitates proper release of the keeper during mounting.

FIGS. 6 and 7 show some details of a typical multi-ridge valve keeper 134. There is a first keeper ridge 136 and a second keeper ridge 138 in this embodiment. Some keepers only have one ridge, and some will have a many as three or more. Since the valve keeper 134 is not held in place on the pliers by pressure, rather by a magnet 126, the valve keeper 134 can be pushed down further so that both ridges are properly aligned before contacting their corresponding circumferential groove on the valve stem. With the old type of valve keeper pliers, the first keeper ridge 136 would engage a corresponding groove, and the keeper would not continue downwardly so that each of the ridges engage the appropriate corresponding groove. This problem required creative solutions by mechanics such as holding the keepers on a screw driver with axle grease to allow both keeper ridges to be placed appropriately.

The jaw ends 114 have valve stem cutouts 140 that allow the pliers 100 to be pushed down onto the valve stem. The circular opening created by the valve stem cutouts 140 on the jaws can be clearly seen in FIG. 3. The valve stem cutout 140 must be of a sufficient depth so that the valve keeper 134 can be pushed down to engage the appropriate keeper cutouts to mate with the keeper ridges 136. With the valve keeper 134 in place, the sloped sides 142 of the valve keeper 134 push the valve keepers against the valve stem holding it in place by way of cooperation of the keeper ridges 136 and the keeper cutouts. Installation of the valve keeper is then complete.

While the invention has been shown, illustrated, described and disclosed in terms of specific embodiments or modifications, the scope of the invention should not be deemed to be limited by the precise embodiment or modification therein shown, illustrated, described or disclosed. Such other embodiments or modifications are intended to be reserved especially as they fall within the scope of the claims herein appended.

Having thus described the invention, I claim:

1. A valve keeper for installing split valve keepers, the tool comprising:

a. jaws and handles with a pivot point therebetween;

b. at least two grasping pins per keeper projecting outwardly from a shoulder stop at a terminal end of each jaw, the pins adapted to abut an outer surface of a keeper;

c. at least one magnet substantially flush with each shoulder stop for engaging an end of a keeper, the magnet adapted to releasably retain a keeper in contact with the grasping pins while minimizing the magnetic attraction between the pins and an engine, whereby, each keeper is retained in contact with at least one magnet and pins without requiring grip pressure to retain said keeper in place, allowing easier insertion of the keeper, particularly in cases where the keeper has more than one retention groove.

2. The pliers of claim 1, the jaws offset of a plane created by the handles.

3. The pliers of claim 2 further comprising a spring means for biasing the jaws in an open direction.

4. The pliers of claim 3 comprised of a substantially non-magnetic material whereby the tendency of the pins to be magnetically drawn toward the engine is minimized.

5. The pliers of claim 3, the grasping pins having a length that is less than a length of the keepers.

6. The pliers of claim 5, the magnets being marginally raised above the shoulder stop whereby more direct contact between the keeper and the magnet is facilitated.

7. The pliers of claim 5, the pivot point having an adjustment means for providing additional spacing between the jaws.

8. A valve keeper tool for installing split valve keepers, the tool comprising:

a. jaws and handles with a pivot point therebetween, the jaws offset of a plane created by the handles;

b. a variable holding means on each jaw of the pliers for releasably retaining a range of sizes of valve keepers, whereby, as a result of the offset jaws a mechanic can more easily access a part of the engine cavity where the keepers need to be installed and the variable holding means allows a mechanic to use the pliers with a wide range of valve keeper sizes rather than needing a specific tool for each size of keeper wherein said jaws each have at least two grasping pins projecting outward from a shoulder.

9. The pliers of claim 8 further comprising a spring means for biasing the jaws in an open direction.

10. The pliers of claim 9 being comprised of a substantially non-magnetic material whereby the tendency of the pins to be magnetically drawn toward the engine is minimized.

11. The pliers of claim 10, the grasping pins having a length that is less than a length of the keepers.

12. The pliers of claim 11, the magnets being marginally raised above the shoulder stop, whereby more direct contact between the keeper and the magnet is provided.

13. The pliers of claim 12, the pivot point having an adjustment means for providing additional spacing between the jaws.

* * * * *